(12) United States Patent
Nicoloff

(10) Patent No.: US 10,666,112 B2
(45) Date of Patent: May 26, 2020

(54) MOTOR MOUNT AND DAMPER

(71) Applicant: AeroVironment, Inc., Monrovia, CA (US)

(72) Inventor: William John Nicoloff, Camarillo, CA (US)

(73) Assignee: AEROVIRONMENT, INC., Monrovia, CA (US)

( * ) Notice: Subject to any disclaimer, the term of this patent is extended or adjusted under 35 U.S.C. 154(b) by 339 days.

(21) Appl. No.: 15/619,976

(22) Filed: Jun. 12, 2017

(65) Prior Publication Data

US 2017/0279334 A1 Sep. 28, 2017

Related U.S. Application Data

(63) Continuation of application No. 14/973,611, filed on Dec. 17, 2015, now Pat. No. 9,705,377.

(60) Provisional application No. 62/094,672, filed on Dec. 19, 2014.

(51) Int. Cl.
*H02K 5/24* (2006.01)
*F16F 15/08* (2006.01)
*F16F 1/376* (2006.01)
*F16M 13/02* (2006.01)
*F16F 1/38* (2006.01)

(52) U.S. Cl.
CPC ............... *H02K 5/24* (2013.01); *F16F 1/376* (2013.01); *F16F 1/3835* (2013.01); *F16F 15/08* (2013.01); *F16M 13/02* (2013.01)

(58) Field of Classification Search
CPC .......... F16F 15/08; F16F 1/376; F16F 1/3835; F16M 13/02; F16M 5/00; H02K 5/24

USPC .......................................................... 310/51
See application file for complete search history.

(56) References Cited

U.S. PATENT DOCUMENTS

| | | | |
|---|---|---|---|
| 5,178,026 A | 1/1993 | Matsumoto | |
| 7,650,819 B2 * | 1/2010 | Haynes | ................. B64C 27/001 |
| | | | 310/51 |
| 2002/0158543 A1 | 10/2002 | Wolters | |
| 2004/0198499 A1 | 10/2004 | Kamdem et al. | |
| 2005/0162024 A1 | 7/2005 | Lim et al. | |
| 2009/0058203 A1 | 3/2009 | Pettitt et al. | |
| 2011/0085926 A1 | 4/2011 | Jung et al. | |
| 2012/0074802 A1 | 3/2012 | Oi et al. | |
| 2012/0193852 A1 * | 8/2012 | Thye-Moormann | ........................ |
| | | | B60G 13/003 |
| | | | 267/292 |
| 2013/0074701 A1 | 3/2013 | Zhao et al. | |
| 2013/0160581 A1 | 6/2013 | Okada et al. | |
| 2013/0337952 A1 | 12/2013 | Berruet et al. | |

(Continued)

OTHER PUBLICATIONS

International Search Report for serial No. PST/US15/66508 dated Feb. 23, 2016.

(Continued)

*Primary Examiner* — Alex W Mok
(74) *Attorney, Agent, or Firm* — Brooks Acordia IP Law, PC; Michael Zarrabian; Eric Aagaard

(57) ABSTRACT

A system having a damper with six or more indentations on alternating sides of the damper, where each indentation is open to an outer circumferential surface of the damper and extends over halfway through a width of the damper, and six or more slots, each slot open to an undulating inner circumferential surface of the damper and extending through the width of the damper.

19 Claims, 18 Drawing Sheets

(56) References Cited

U.S. PATENT DOCUMENTS

2014/0084726 A1     3/2014   Burton et al.
2014/0367546 A1    12/2014   Hibi et al.

OTHER PUBLICATIONS

Non-Final Office action for U.S. Appl. No. 14/973,611 dated Sep. 12, 2016.
Notice of Allowance for U.S. Appl. No. 14/973,611 dated Mar. 10, 2017.

\* cited by examiner

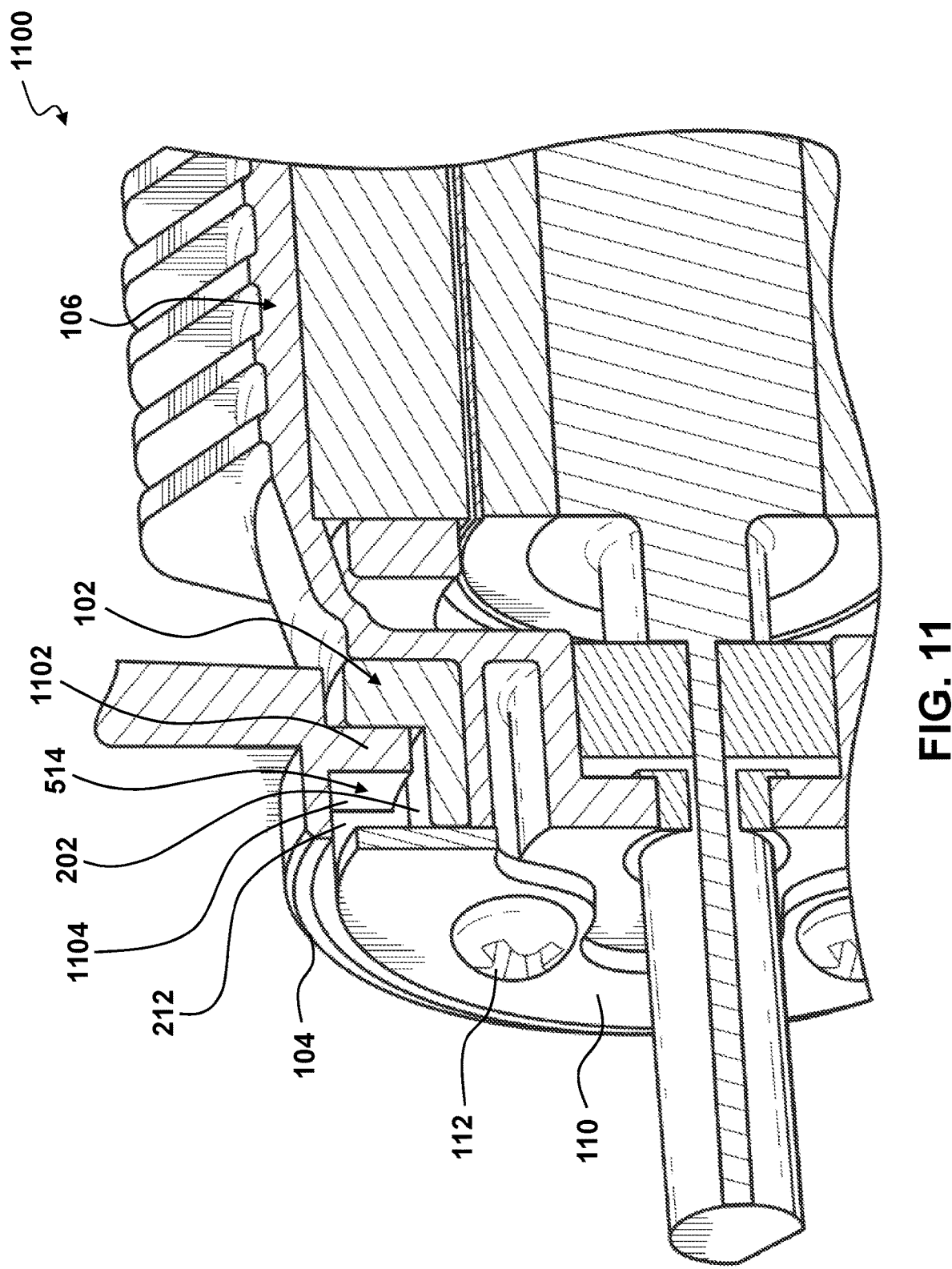

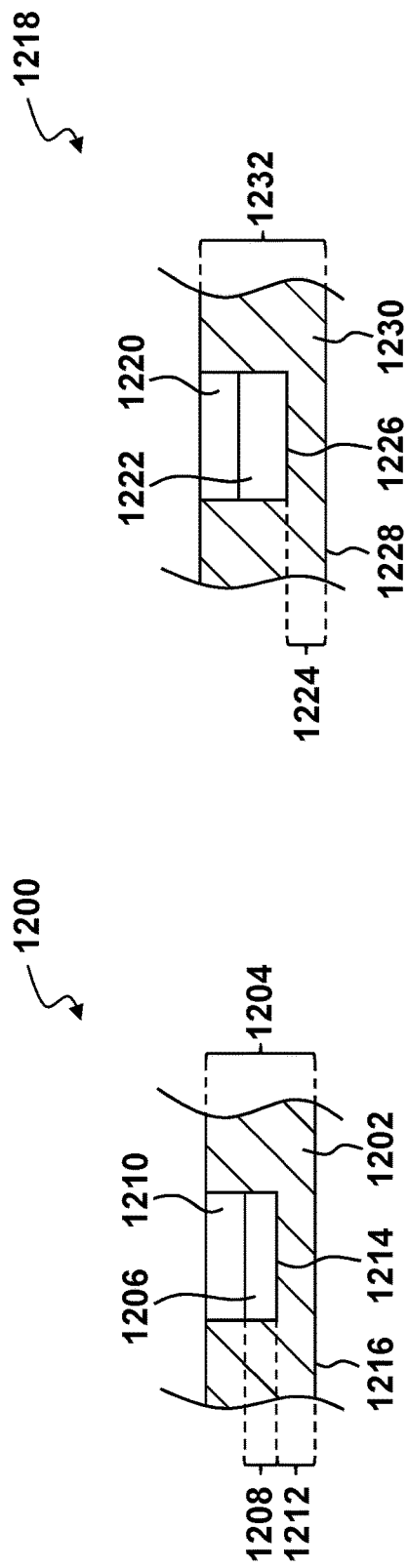
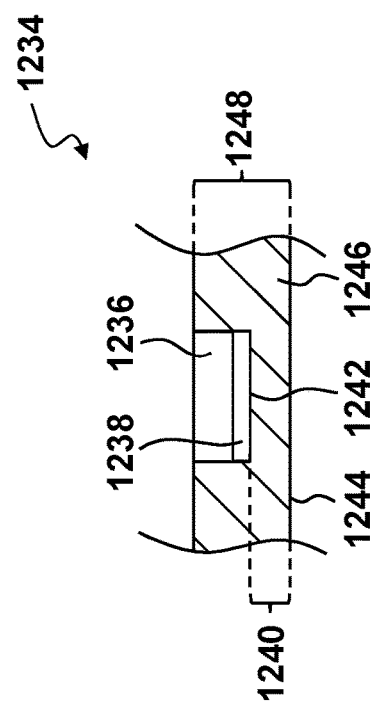
FIG. 12A
FIG. 12B
FIG. 12C

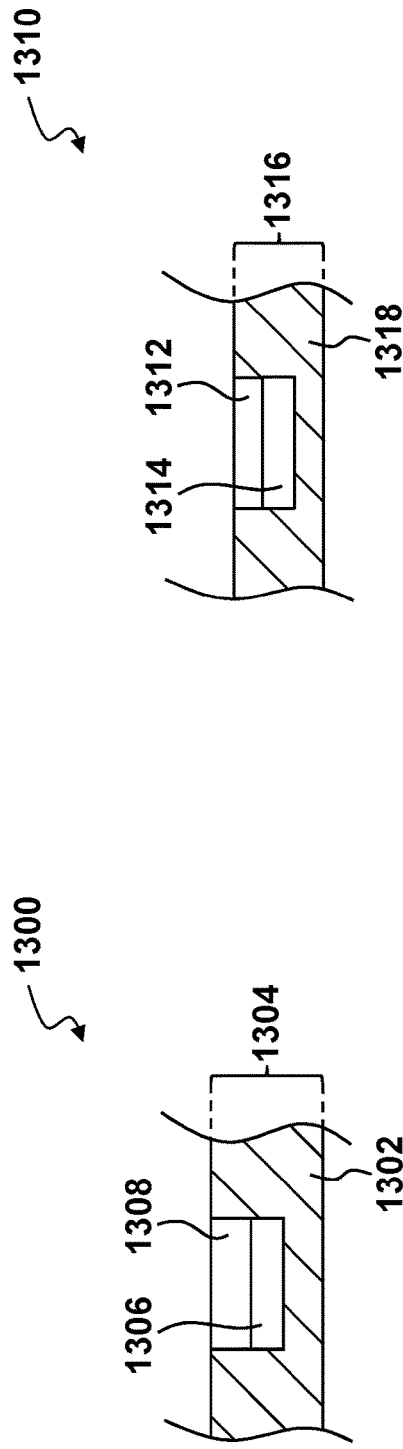
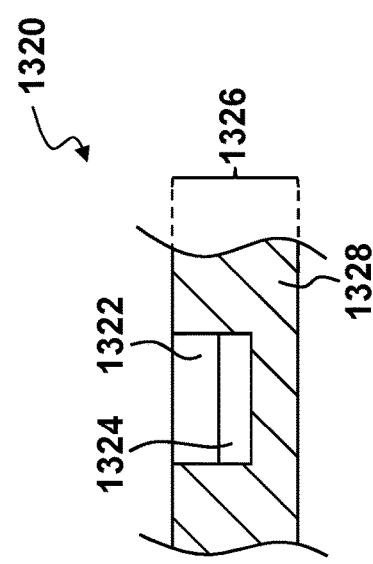
FIG. 13A
FIG. 13B
FIG. 13C

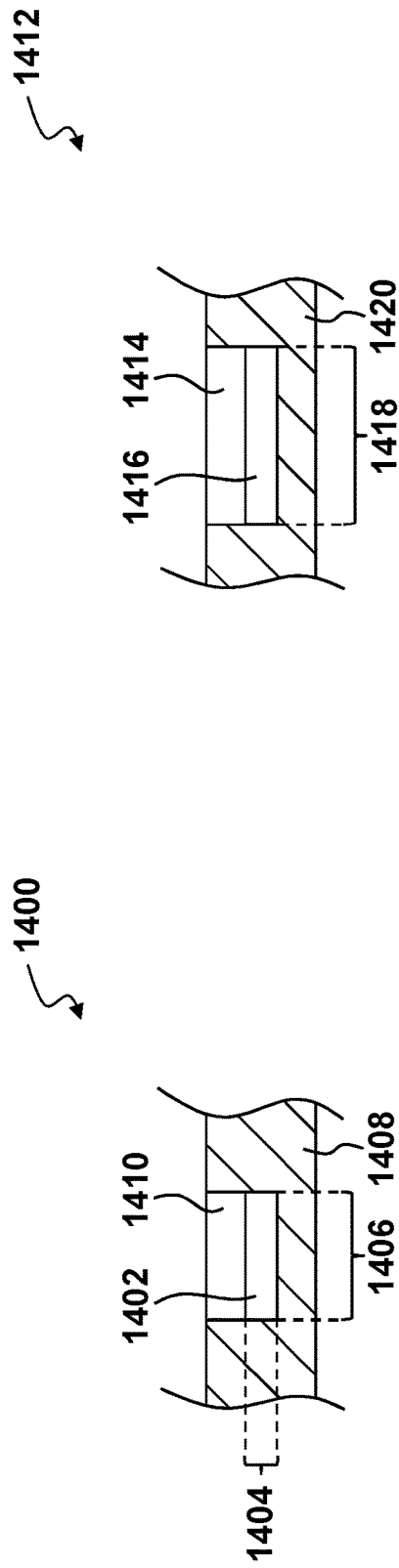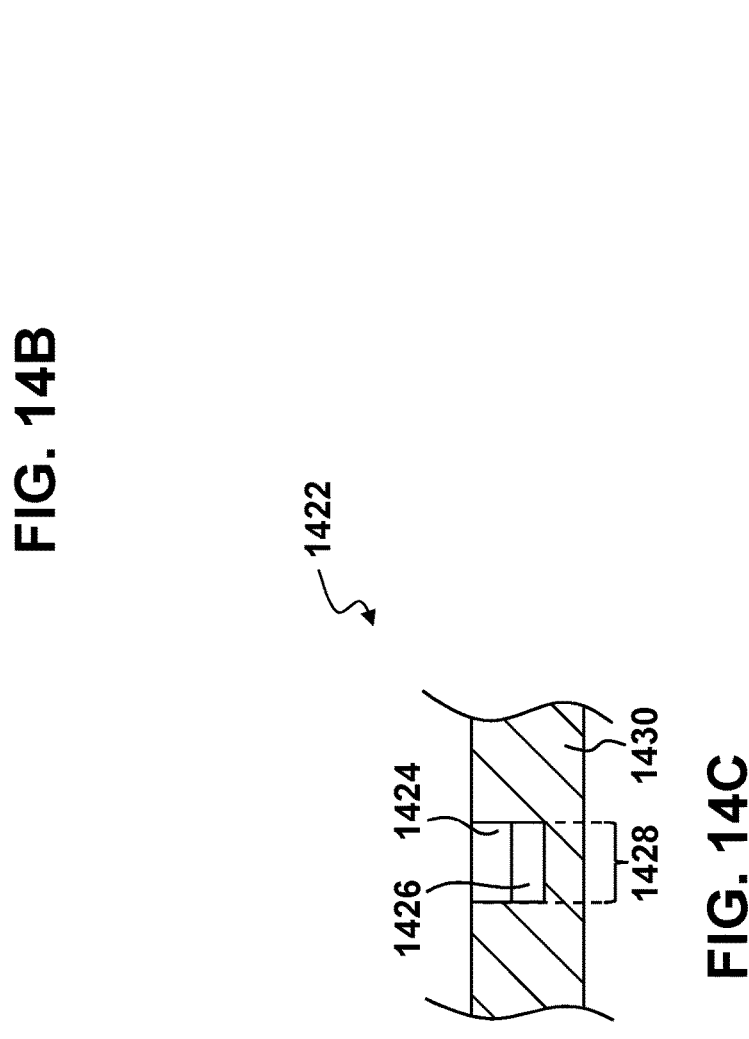

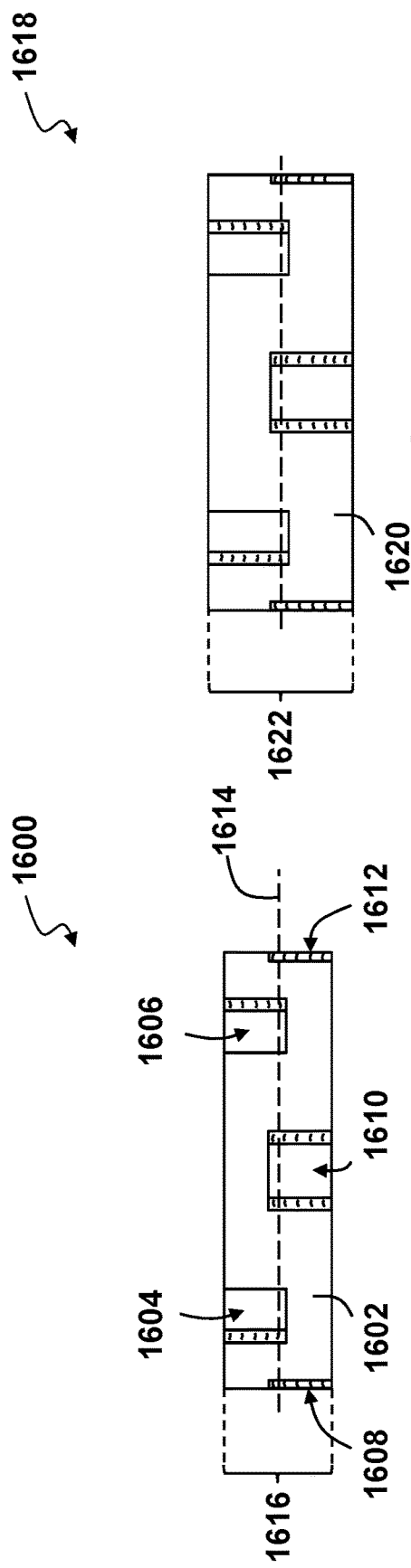
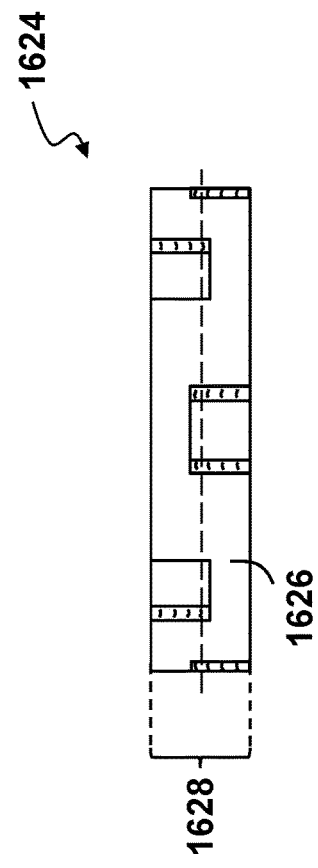
FIG. 16A
FIG. 16B
FIG. 16C

MOTOR MOUNT AND DAMPER

CROSS-REFERENCE TO RELATED APPLICATIONS

This application is a continuation of U.S. Nonprovisional patent application Ser. No. 14/973,611, filed Dec. 17, 2015, which claims priority to and the benefit of U.S. Provisional Patent Application No. 62/094,672, filed Dec. 19, 2014, the contents of all of which are hereby incorporated by reference herein for all purposes.

TECHNICAL FIELD

The invention, in its several embodiments, pertains to motor mounts, and more particularly to motor mount vibration dampening.

BACKGROUND

Electric motors create vibration, which can cause interference with other vibration-sensitive components. In an unmanned aerial vehicle (UAV), a motor driving a spinning high inertial mass, i.e., a propeller, will impart vibrations on the fuselage during flight. These vibrations may affect sensors and/or navigation of the UAV, e.g., via an inertial navigation system (INS). As UAVs are made lighter, they may become more sensitive to vibrations caused by the motor. Additionally, the configuration of many UAVs leaves limited space, and weight limits, within which to place a dampener for motor vibrations. Existing solutions involve dampening motor vibrations by a dampening material attached via a spring. Other solutions involve attaching elastomers directly to a motor by an adhesive, which presents serious manufacturing and long-term reliability issues. A need exists for a compact dampener for motor vibrations that is long-lasting, reliable, and serviceable.

SUMMARY

Some embodiments of the present invention may include a system having a damper, the damper having six or more indentations on alternating sides of the damper, where each indentation may be open to an outer circumferential surface of the damper and extend over halfway through a width of the damper; and six or more slots, each slot open to an undulating inner circumferential surface of the damper and extending through the width of the damper. In additional system embodiments, the system may further have a motor mount having six or more tabs disposed about an aperture in a same plane extending parallel to a front face of the motor mount. In additional system embodiments, the six or more tabs of the motor mount may be seated in the six or more indentations of the damper to self-encapsulate the outer circumferential surface of the damper in the motor mount. In additional system embodiments, the system may further have a motor having six or more fins disposed along an outer edge of the motor. In additional system embodiments, the motor may further have a shaft and one or more apertures for receiving a fastener. In additional system embodiments, the motor may be a brushless direct current (BLDC) motor. In additional system embodiments, the six or more fins of the motor may be seated in the six or more slots of the damper. In additional system embodiments, the six or more fins of the motor and the outer edge of the motor may compress the damper against the six or more tabs of the motor mount and into an air space in the six or more indentations. In additional system embodiments, the system may further have a plate having one or more apertures for receiving a fastener. In additional system embodiments, the plate may be connected to the motor by a fastener inserted through the one or more apertures of the plate and the one or more apertures of the motor, and the plate may cover the damper and the six or more fins of the motor. In additional system embodiments, the plate may further have a central aperture to receive the shaft of the motor. In additional system embodiments, the plate may further have an additional thickness, where the additional thickness of the plate may further compress the damper against the six or more tabs of the motor mount and into the air space in the six or more indentations. In additional system embodiments, the motor mount may be connected to a fuselage of an unmanned aerial vehicle (UAV). In additional system embodiments, the damper may be reversible in the motor mount. In additional system embodiments, the damper may have eight equally spaced alternating indentations. In additional system embodiments, the motor mount may have eight tabs, and the eight alternating indentations of the motor mount may be seated in the eight tabs, such that four tabs may be visible on a front side of the motor mount and four tabs may be visible on a back side of the motor mount.

An additional exemplary system embodiment may have a damper, the damper having: two or more indentations on alternating sides of the damper, where each indentation may be open to an outer circumferential surface of the damper and may extend partially through a width of the damper; and one or more slots, where each slot may be open to an inner circumferential surface of the damper and may extend at least partially through the width of the damper.

BRIEF DESCRIPTION OF DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 11 depicts a perspective cross-sectional view of a motor mount assembly having a damper installed in the donut-shaped area between the motor and the motor mount;

FIGS. 12A-12C depict cross-sectional views of a damper and tab with varying tab thicknesses and a constant relative damper thickness;

FIGS. 13A-13C depict cross-sectional views of a damper and tab with varying damper thicknesses and a constant tab thickness;

FIGS. 14A-14C depict cross-sectional views of a damper and tab with varying tab lengths, a constant tab thickness, and a constant damper thickness;

FIGS. 16A-16C depict side views of a damper with varying thicknesses;

DETAILED DESCRIPTION

The present invention allows for a self-encapsulated damper along an outer circumferential surface that is long-lasting, reliable, and serviceable. The dimensions of this damper and/or corresponding motor mount may be varied to independently adjust the stiffness of rotation, thrust, and yaw and roll. The damper may have six or more indentations on alternating sides of the damper and extending over halfway through the width of the damper, where each indentation is open to an outer circumferential surface of the damper. An undulating inner circumferential surface of the damper may have six or more slots, each of which extend through the width of the damper. The damper may be placed in a donut-shaped space available on an unmanned aerial vehicle (UAV) between the motor mount and a motor. The motor mount may have six or more tabs disposed in a plane that may extend parallel to a front surface of the motor mount. Each of the six or more tabs may be seated into respective indentations of the damper to self-encapsulate the outer circumferential surface of the damper and secure it in place, i.e., the damper is held in place in the motor mount without the need of any additional covers or holds. The motor may have six or more fins disposed along an outer edge of the face of the motor and these six or more fins may be seated in respective slots of the undulating inner circumferential surface of the damper. Force applied by the outer edge of the motor and fins may compress the damper around the tabs of the motor mount, further securing the damper in place, while retaining air space for compression.

Figure 1:
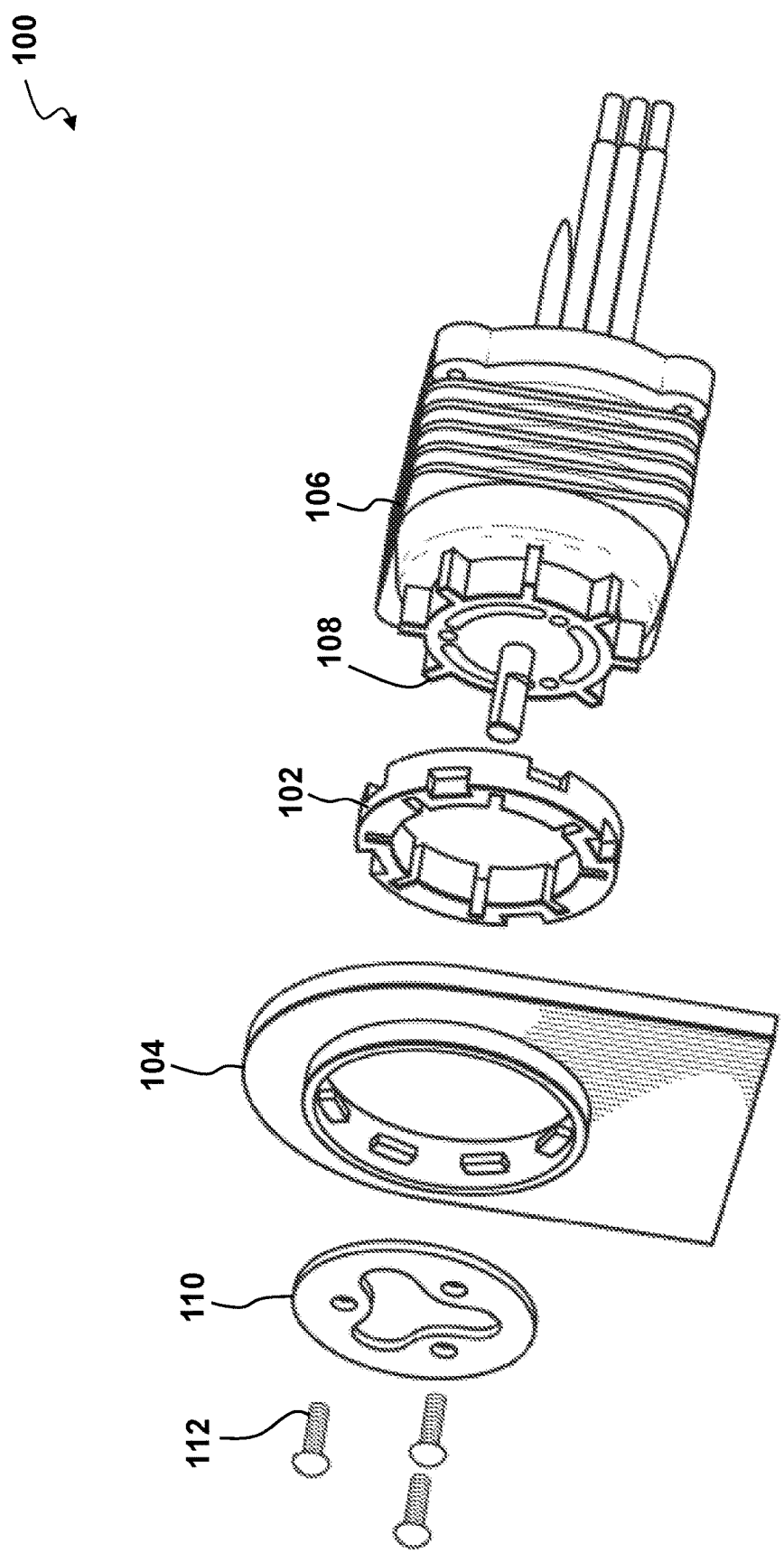
FIG. 1 depicts an exploded perspective view of a motor mount assembly having a motor with fins, a damper, a motor mount, a plate, and one or more fasteners.

FIG. 1 depicts an exploded perspective view of a motor mount assembly 100. The damper 102 is placed in the motor mount 104, which is aligned with the motor 106 via the fins 108 of the motor 106. The damper 102 is protected from outside elements by the motor 106, on one face, and a plate 110, on the opposite face. The outer circumferential surface of the damper 102 is self-encapsulated by the motor mount 104, i.e., the damper 102 does not require any additional supports and/or adhesives to remain in place in the motor mount 104. The plate 110 may be attached over the damper 102, and secured to the motor 106 by one or more fasteners 112.

The motor 106 may be disposed in a UAV and generate vibrations that may be imparted to a fuselage of the UAV via the motor mount 104. The damper 102 dampens these vibrations created by the motor 106, which lessen any effects of the vibrations on UAV performance and/or controls. The location of the damper 102 in the donut-shaped space available between the motor mount 104 and the motor 106 uses minimal space in the fuselage of the UAV. As the outer circumferential surface of the damper 102 is self-encapsulated by the motor mount 104, rather than fixed by adhesive or other means, the damper 102, and/or other components, may be easily removed and/or replaced as needed. For example, if the motor 106 needs to be replaced due to failure, the damper 102 may be reused by a new motor as the damper 102 is not adhesively fixed to the motor 106 and/or motor mount 104.

Figure 2A:
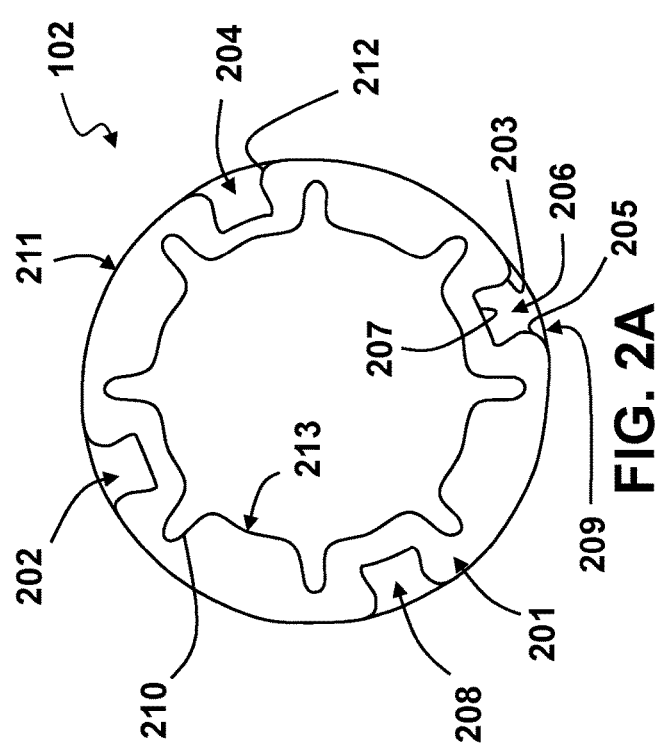
FIG. 2A depicts a top view of a damper used to minimize vibrations from a motor.

FIG. 2A depicts a top view of the damper 102 having four visible indentations (202, 204, 206, 208) extending into a front face 201 of the damper 102 and having eight slots 210 that extend through a width of the damper 102. The damper 102 may be made from an elastomer, e.g., rubber, having a low durometer and/or desired viscoelastic properties. In some embodiments, the durometer of the damper 102 may be adjusted to increase or decrease the dampening of vibrations, e.g., increasing the durometer of the damper 102 material may decrease dampening. Each indentation (202, 204, 206, 208) may extend over halfway through the width of the damper 102, have opposing indentation sidewalls (203, 205), an inner wall 207, an opening 209 on an outer circumferential surface 211, and be arranged symmetrically around the damper 102. The opposing indentation sidewalls (203, 205) of each indentation (202, 204, 206, 208) may have a curved edge 212, or lobe, that may compress against an inserted tab of the motor mount 104 (See FIG. 6). The eight slots 210 are each open to an undulating inner circumferential surface 213 of the damper 102 and may extend through the width of the damper 102. These slots 210 may be used to secure and/or align the fins 310 of the motor 106 in the damper 102 (See FIG. 7).

Figure 2B:
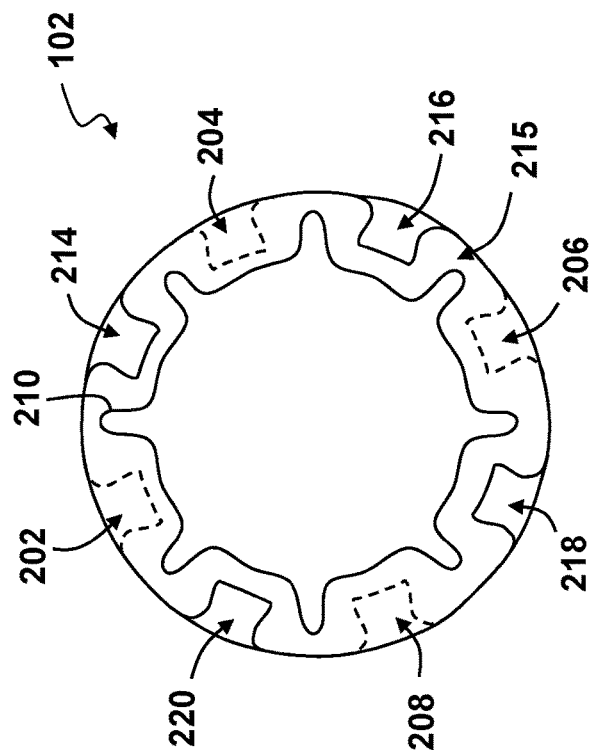
FIG. 2B depicts a bottom view of a damper with indentations visible from the top view depicted as dashed lines.

FIG. 2B depicts a bottom view of the damper 102 illustrated in FIG. 1A having four additional indentations (214, 216, 218, 220) extending into a rear face 215. The four indentations (202, 204, 206, 208) on the front face 201 are depicted with dashed lines (See FIG. 2A). The damper 102 may have eight indentations (202, 204, 206, 208, 214, 216, 218, 220) total, with four indentations formed on each side. Some embodiments may have a total of six or more indentations. The indentations (202, 204, 206, 208, 214, 216, 218, 220) may be arranged symmetrically about the damper 102. Each indentation may be separated from each adjacent indentation by one or more slots 210 which may receive respective fins 210 from the motor 106 (See FIG. 7).

Figure 2C:
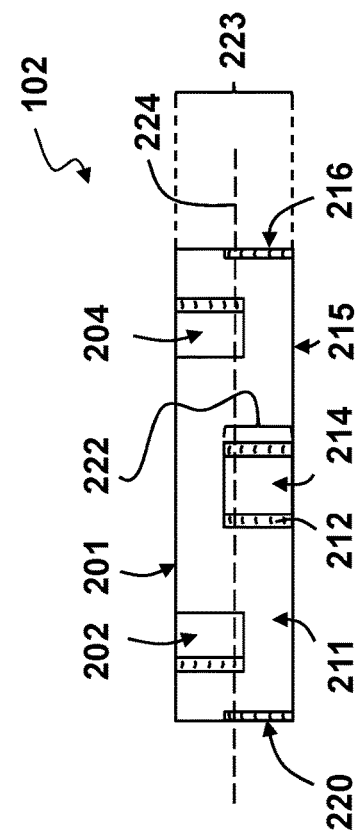
FIG. 2C depicts a side view of a damper showing indentations visible on each face of the damper.

FIG. 2C depicts a side view of the damper 102 showing indentations (220, 202, 214, 204, 216) spaced apart circumferentially and disposed on alternate faces (201, 215) of the damper 102. Each indentation (202, 204, 206, 208) is open to an outer circumferential surface 211 of the damper 102, such that the depth 222 of each indentation may extend over halfway through the width 223 of the damper, i.e., past a centerline 224 of the damper 102. This allows for each tab of the motor mount 104, located in the same plane, to be seated in a respective indentation of the damper 102 (See FIG. 6). This arrangement of alternating indentations creates a self-encapsulating damper 102 along the outer circumferential surface 211. Each indentation may have a curved edge 212, or lobe, to allow the damper 102 to compress around these tabs. The damper 102 may be injection molded as a single part.

Figure 3:
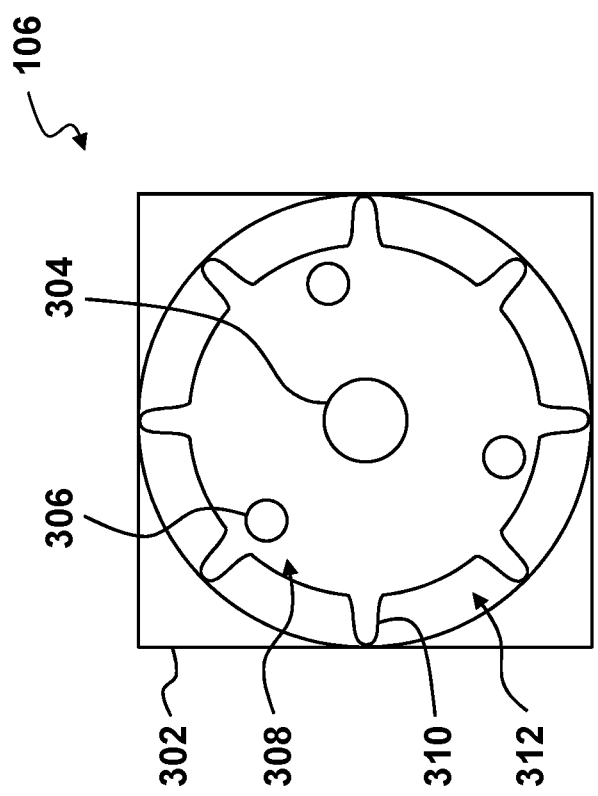
FIG. 3 depicts a top view of a motor, such as a brushless Direct Current (BLDC) motor, that creates vibrations.

FIG. 3 depicts a top view of the motor 106, such as a brushless Direct Current (BLDC) motor used to drive a propeller in a UAV. The motor 106 may have a motor housing 302 and shaft 304 for connecting to a propeller or gearbox. The motor 106 may also have one of more apertures 306 disposed on a front face 308 of the motor 106 for connecting fasteners, e.g., a screw, to secure a plate (See FIG. 4) to the motor 106. The motor 106 may also have one or more fins 310 protruding from the lower face 312 of the motor 106 up to the front face 308 of the motor 106. The height of these fins 310 may be the same as the width of the damper. These fins 310 may be arranged circumferentially and extending radially about the front face 308 of the motor 106 in a symmetrical pattern (See FIG. 7). In some embodiments, the arrangement of fins 310 may be non-symmetrical to only allow for a certain placement of the motor 106 relative to the damper and motor mount.

Figure 4:
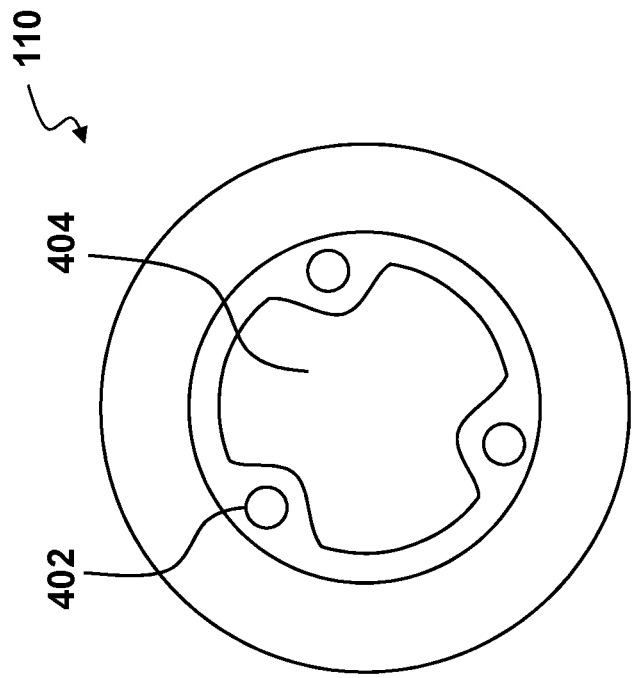
FIG. 4 depicts a top view of a plate which may be used to cover an open end of a motor.

FIG. 4 depicts the plate 110 for covering the motor once the motor has been inserted into the motor mount and damper (See FIG. 8) to ensure the motor is secured as well as to protect the motor and damper from any outside elements. The plate 110 may have one or more apertures 402 for inserting a fastener, e.g., a screw, to secure the plate 110 to the motor. The plate 110 may have an opening 404 for the motor shaft 304 (See FIG. 3) and part of the front face 308 (See FIG. 3) of the motor 106. The plate 110 may be made from a thin material to protect the motor and damper from outside elements while providing no or minimal additional compression to the damper. In some embodiments, the plate 110 may be thicker in order to impart additional compression on the damper.

Figure 5:
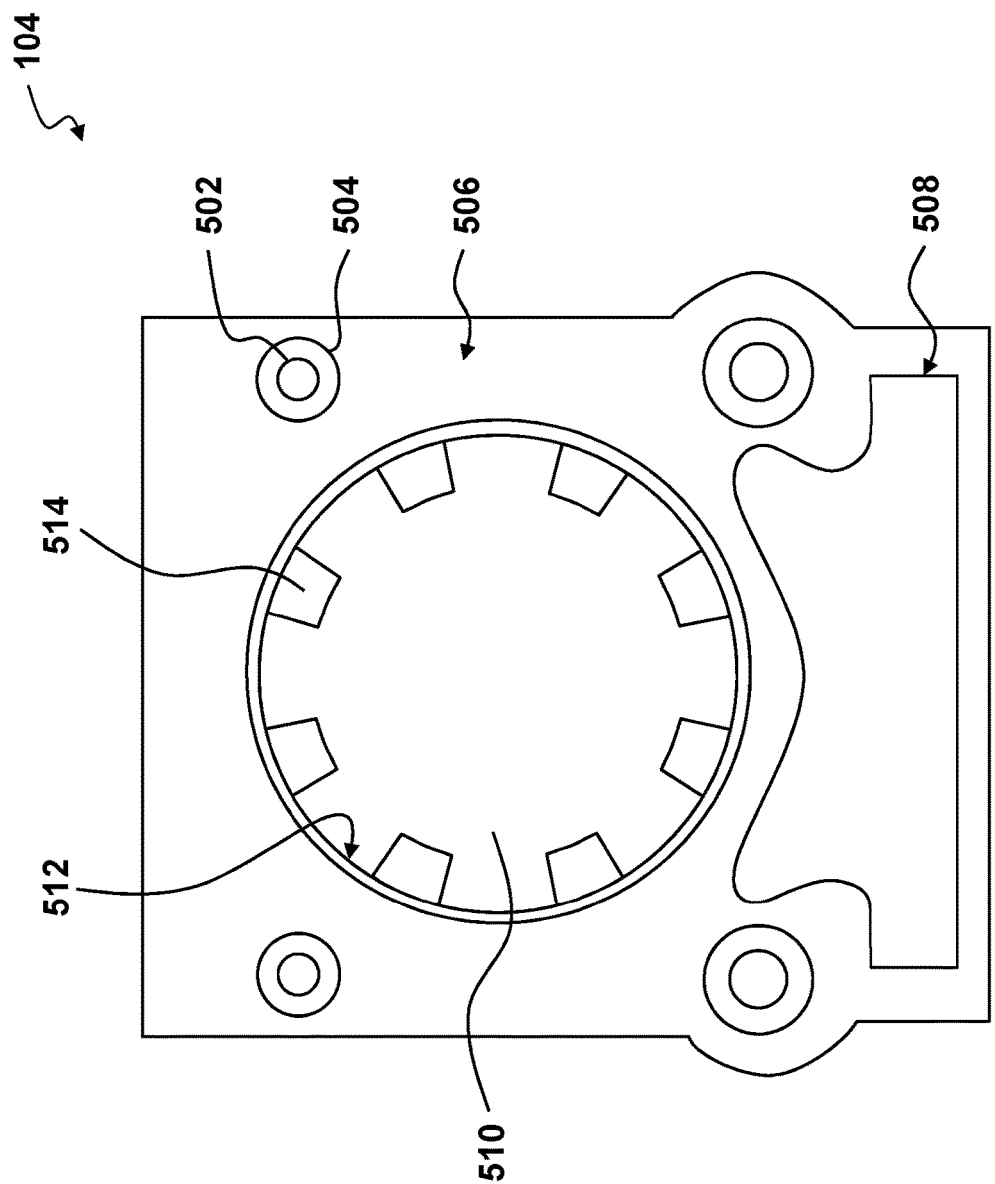
FIG. 5 depicts a top view of a motor mount having an aperture to receive a motor and eight tabs in the same plane.

FIG. 5 depicts the motor mount 104 for connecting the damper, the motor, and the plate to a fuselage of a UAV. The motor mount 104 may have one or more apertures 502 for inserting fasteners, e.g., screws, to connect the motor mount 104 to the fuselage of the UAV. The one or more apertures 502 may have one or more countersinks 504 to ensure any fastener is flush against a front face 506 of the motor mount 104. The motor mount 104 may have one or more indents 508 where excess material may be milled out to reduce weight without compromising the structural integrity of the motor mount 104. The motor mount 104 may have an aperture 510 having an edge 512 with a width for inserting the damper and motor. The width of this edge 512 may be the same as the width of the damper and/or the fins of the motor. Tabs 514 may be disposed around the edge 512 of the aperture 510 in a symmetrical pattern and in a same plane, which may extend parallel to the front face 506 of the motor mount 104. In some embodiments, there may be six or more tabs 514, e.g., eight equally-spaced tabs 514. Having the tabs 514 in the same plane may simplify manufacturing, but in some embodiments, the tabs may be located in different planes.

Figure 6:
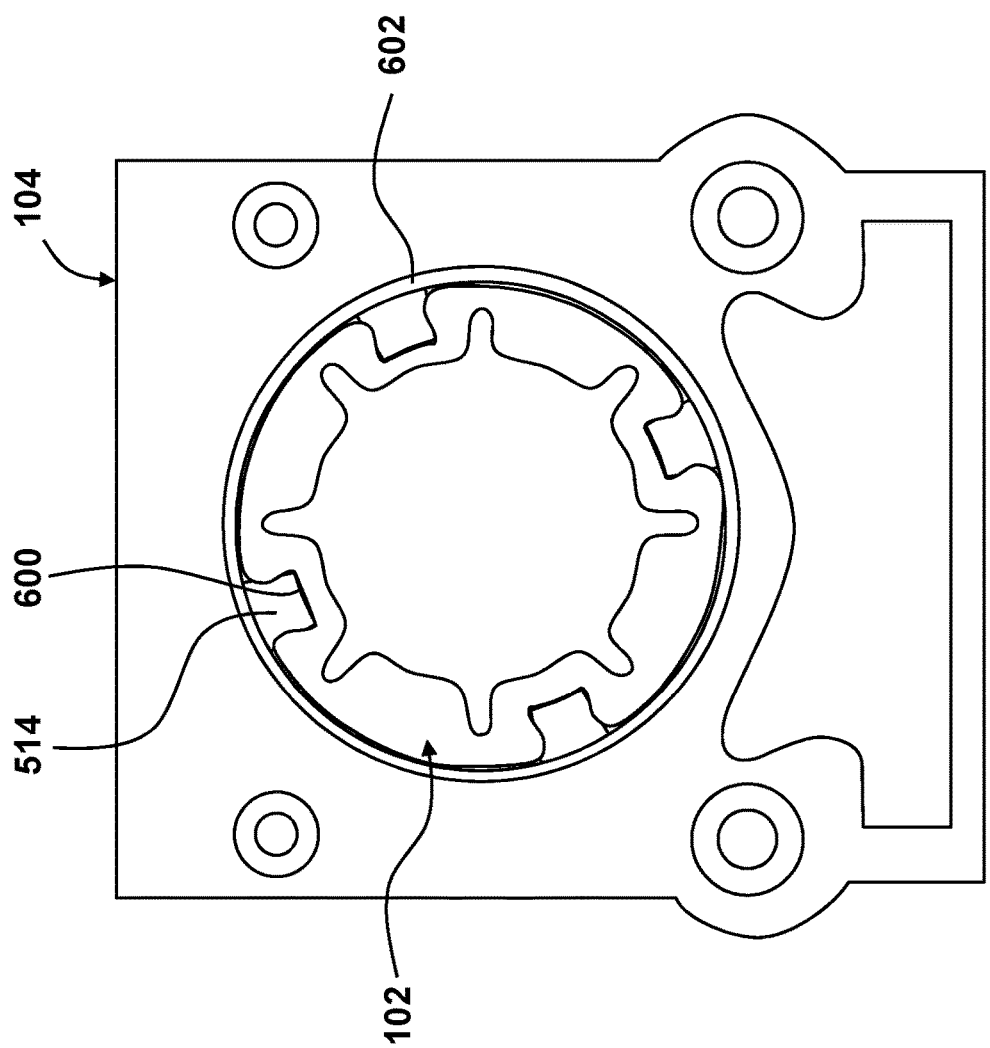
FIG. 6 depicts a top view of a motor mount having a damper installed in the aperture and four tabs being visible on each side of the motor mount.

FIG. 6 depicts the damper 102 installed in the motor mount 104 with four of the tabs 514 visible from the front view. Each tab 514 is seated in a corresponding indentation 600 of the damper. The damper 102 is held in place by these indentations 600, which are disposed on alternating faces of the damper 102 and are each seated in tabs 514 disposed in the same plane. As a result of this configuration, four of the eight total tabs 514 are visible from the front view of the motor mount 104. The air space 602 in each indentation 600 of the damper 102 is the space remaining in each indentation 600 after each indentation 600 is seated in each tab 514. The air space 602 allows the damper 102 to further compress around each tab 514. If this air space 602 was not present, the dampening would go up significantly, and thus the coupling would be greater, which would create additional vibration in the UAV fuselage attached to the motor mount 104. This air space 602 creates a more flexible, and vibration absorbent, damper 102 without changing the durometer of the damper 102 material itself. The damper 102 is depicted as symmetrical, but in some embodiments the damper may be asymmetrical. This asymmetrical arrangement may be used to change the properties of the damper, e.g., rotating an asymmetrical damper by ninety degrees may change the stiffness of yaw vs. roll. The symmetrical damper 102 may be used to ensure that the damper 102 cannot be installed incorrectly in the motor mount 104, e.g., via user error, which could have an unintended effect on the UAV.

Figure 7:
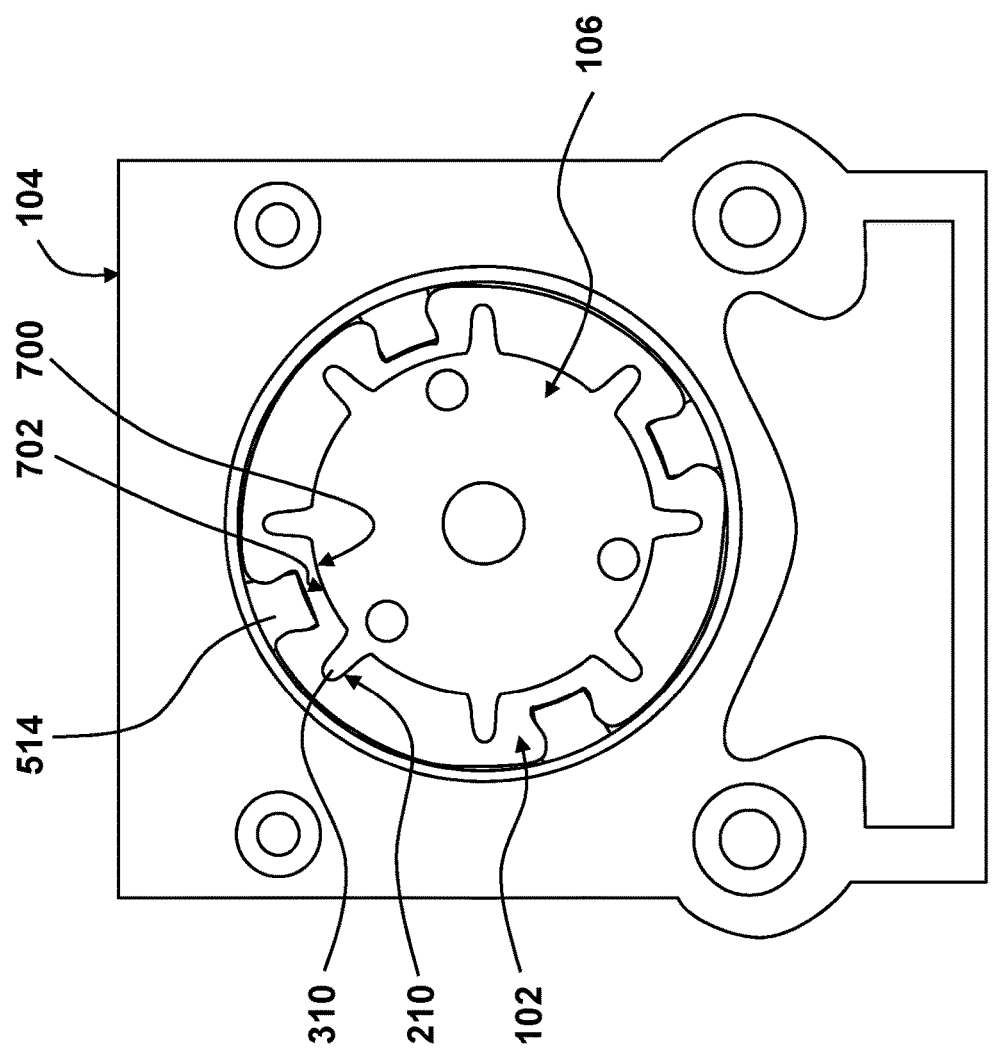
FIG. 7 depicts a top view of a motor mount having a damper and motor installed in the aperture with the fins and outer edge of the motor compressing the damper.

FIG. 7 depicts the motor 106 and damper 102 installed in the motor mount 104. The fins 310 of the motor 106 are seated in the slots 210 of the damper 102 using a friction fit, and the outer surface 702 of the motor 106 compresses the inner circumferential surface 700 of the damper 102. The fins 310 and outer surface 702 of the motor 106 compresses the damper 102 against each of the tabs 514 of the motor mount 104 and further inhibits removal of the damper 102 from the motor mount 104.

Figure 8:
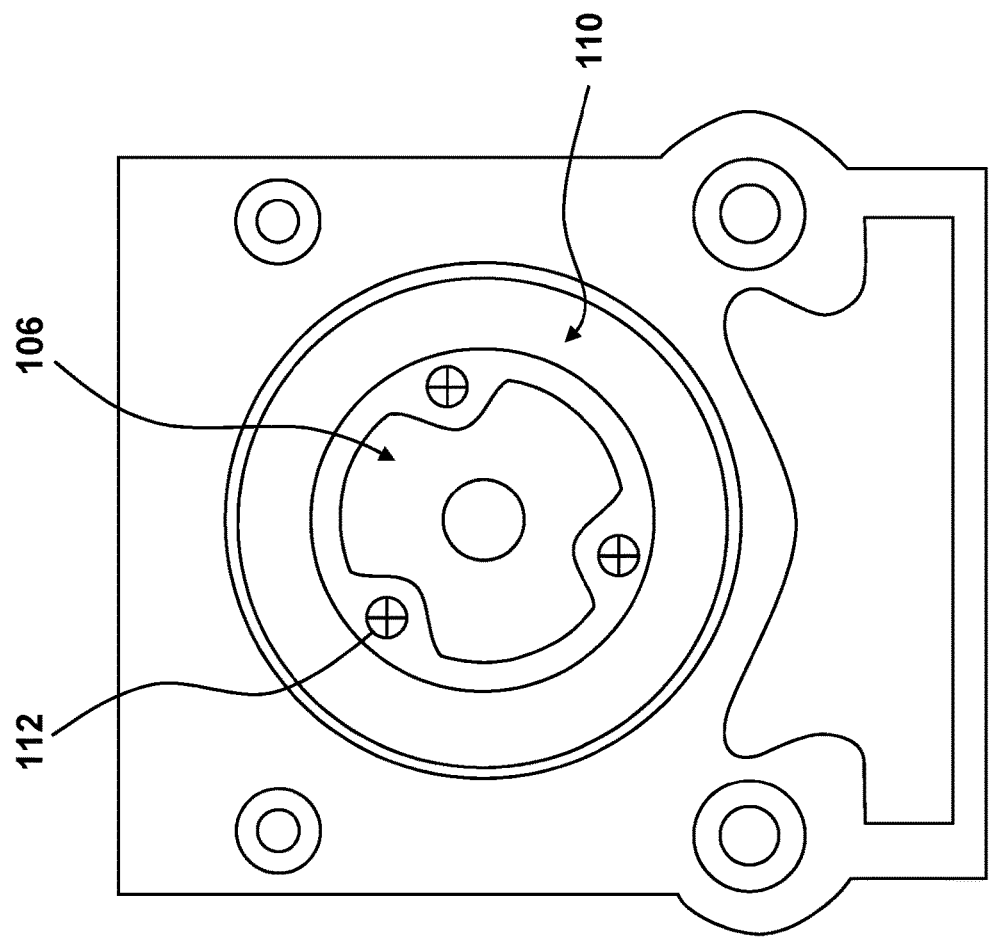
FIG. 8 depicts a top view of a motor mount having a plate installed over the motor and damper to secure the damper in place between the motor and the plate.

FIG. 8 depicts the plate 110 secured over the top of the motor 106 and damper, which seals in the damper and protects the motor 106 and damper from the external environment. The plate 110 may be secured to the motor 106 by one or more fasteners 112, e.g., one or more screws. In some embodiments, the plate 110 may have an additional thickness to further compress the damper.

Figure 9:
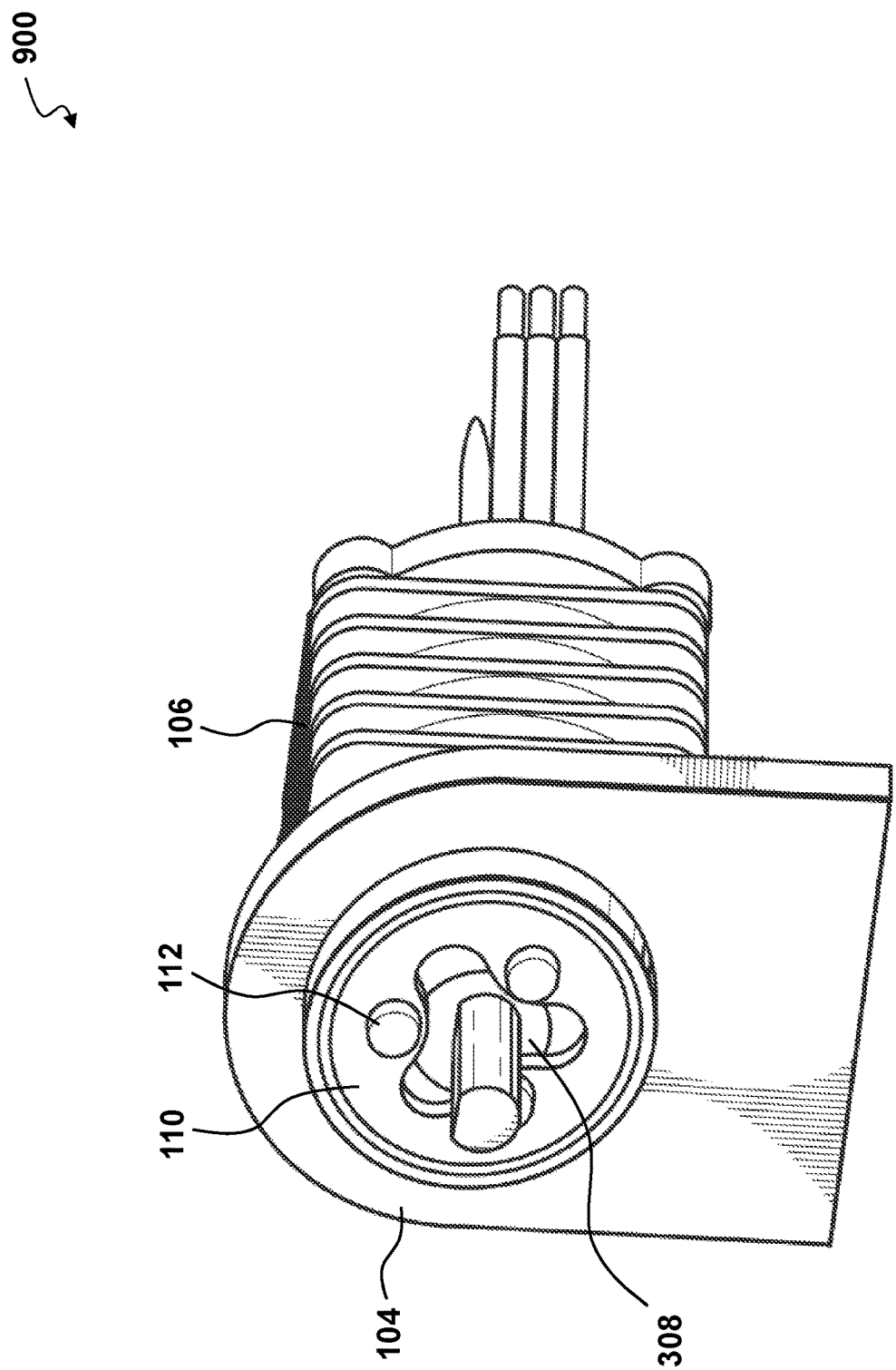
FIG. 9 depicts a front perspective view of a motor mount assembly having a plate installed over a damper and motor to secure the damper between the motor and the plate.

FIG. 9 depicts a front perspective view of the motor mount assembly 900. The damper is secured in the motor assembly and protected from outside elements by the plate 110, which is secured by one or more fasteners 112. The face of the motor 308 is visible through the plate 110. The motor mount 104 may be mounted in the UAV and dampen vibrations from the motor 106.

Figure 10:
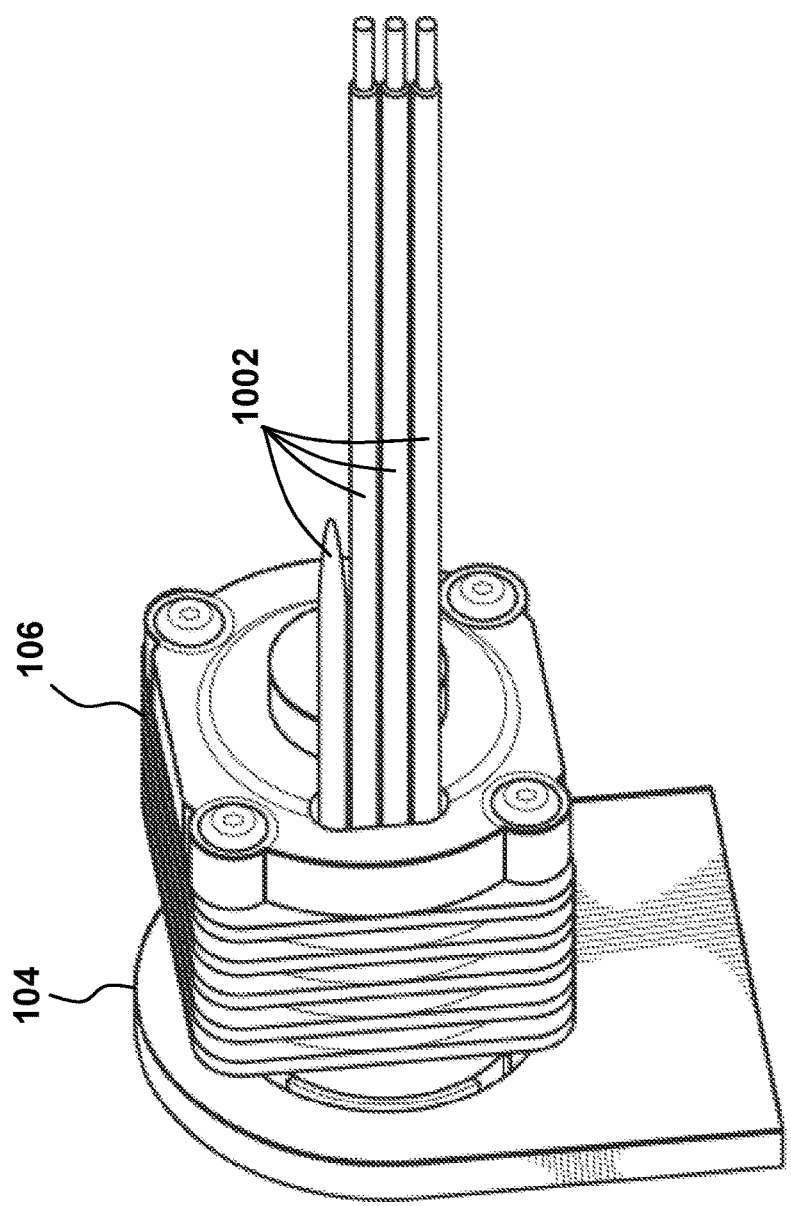
FIG. 10 depicts a rear perspective view of a motor mount assembly having one or more wires for control and/or power of the motor.

FIG. 10 depicts a rear perspective view of the motor mount assembly 1000. The vibrations of the motor 106 are dampened by the self-encapsulated damper placed between the motor 106 and the motor mount 104. One or more wires 1002 may be used to provide power and/or control to the motor 106.

FIG. 11 depicts a cross-sectional perspective view of the motor mount assembly 1100. The damper 102 is placed in the motor mount 104 such that the rigid tab 514 of the motor mount 104 is seated in an elastic indentation 202 of the damper 102 using a friction fit. The indentation 202 of the damper 102 may have a curved edge 212, or lobe, on opposing indentation sidewalls (See FIG. 2A) that allows for further compression of the damper 102 around the tab 514 when the motor 106 is inserted into the damper 102. The plate 110 may be placed over the motor 106 and damper 102 and secured with one or more fasteners 112.

In general, the stiffness, i.e., spring rate, of the damper 102 is directly correlated to its overall surface area in contact with the motor mount 104 and the motor 106, damper 102 durometer, and an inverse of the thickness of the damper 102. Dampening is a function of the material properties of the damper 102 material. There is a dependent relation between all the different motions, e.g., yaw, thrust, pitch, roll, and radial motions, but each can be somewhat independently adjusted by: varying the tab 514 thickness (See FIGS. 12A-12C); varying the fin thickness (See FIGS. 15A-15C); varying the damper 102 thickness (See FIGS. 16A-16C); varying the number of tabs 514 (See FIG. 17); varying the number of fins (See FIG. 17); asymmetrically positioning the fins and tabs 514 to bias for a desired action (See FIG. 18); changing the diameter of the assembly; asymmetrically biasing the diameter to bias for a desired action; and creating a non-round shape (See FIGS. 19A-19B), e.g., oval, rectangular, or triangular, to selectively bias for a desired result.

Adjusting rotational stiffness is a summation of the eight, or n, tabs 514 in contact with the damper 102 in relation to force diameter, or distance from the rotational center. The force diameter refers to where twice the radius of the center of pressure is being reacted. The side 1102 of the tab 514, i.e., compressive spring rate, and the face 1104 of the tab 514, i.e., shear, do not correlate with radial position as long as the fins are mirrored. Rotational stiffness is increased by one or more of the following: thickening the tab 514; thinning the damper 102 between the tab 514 and the fin; increasing the durometer of the damper 102; and changing the diameter relative to the rotational center. Adjusting radial stiffness is strongly correlated with rotational stiffness but without the dependency to force diameter. Increasing force diameter while reducing the contact face area can keep the same rotational stiffness, while dropping the radial stiffness. Torque is a measure of force times radius. T=F*r or F=T/r. Torque is a constant, so increasing the radius of the force on the damper 102 will lower the force, which results in a smaller deflection per force, and a stiffer damper 102.

Adjusting thrust stiffness is a summation of the eight, or n, divided by two (n/2) tabs 514 in contact with the damper 102 in the following locations: a side 1102 of the tab 514, i.e., in shear, and a face 1104 of the tab 514, i.e., compression, divided by two, because the tabs 514 are skipped. The tabs 514 do not need to be symmetrical, only mirrored, and thrust stiffness is not correlated to force diameter.

Adjusting the tilt or yaw stiffness is related to force diameter plus biasing the stiffness of the eight, or n, contact faces in a mirrored fashion: a side 1102 of the tab 514, i.e., in shear, and a face 1104 of the tab 514, i.e., compression. Top and bottom lobe 212 stiffness is directly correlated to pitch while adjusting the right and left lobe 212 is yaw. Increasing the fin width or tightness/quantity of fins in the desired orientation, and/or force diameter/radius increase will also increase its stiffness. In the case of tilt, its stiffness is due to the separation between the average stiffness above and below the horizontal plane. Increasing the separation distance will increase the stiffness. The same applies for yaw, but across the vertical plane.

FIGS. 12A-12C depict cross-sectional views (1200, 1218, 1234) of a damper and tab with varying tab thicknesses and a constant relative damper thickness. FIG. 12A depicts a cross-sectional view 1200 of the damper 1202 having a width 1204. A tab 1206 of the motor mount has a tab width 1208. The damper 1202 is dimensioned to fit the motor mount tab 1206 and motor mount edge 1210. The damper 1202 has a relative damper thickness 1212 from a face 1214 of the tab 1206 to a face 1216 of the damper 1210.

FIG. 12B depicts a cross-sectional view 1218 of a motor mount edge 1220 having a thicker tab 1222 than the tab in FIG. 12A, but with a constant thickness 1224 from a face 1226 of the tab 1222 to a face 1228 of the damper 1230, as compared to FIG. 12A. Accordingly, the width 1232 of the damper 1230 is thicker than in FIG. 12A. The damper 1230 provides an increase in rotational spring rate as compared to FIG. 12A.

FIG. 12C depicts a cross-sectional view 1234 of a motor mount edge 1236 having a thinner tab 1238 than the tab in FIG. 12A, but with a constant thickness 1240 from a face 1242 of the tab 1238 to a face 1244 of the damper 1246, as compared to FIG. 12A. Accordingly, the width 1248 of damper 1246 is thinner than in FIG. 12A. The damper 1246 provides a decrease in rotational spring rate as compared to FIG. 12A.

FIGS. 13A-13C depict cross-sectional views (1300, 1310, 1320) of a damper and tab with varying damper thicknesses and a constant tab thickness. FIG. 13A depicts a cross-sectional view 1300 of a damper 1302 having a width 1304. The damper 1302 is dimensioned to fit the motor mount tab 1306 and motor mount edge 1308.

FIG. 13B depicts a cross-sectional view 1310 of a motor mount edge 1312 having a tab 1314 with an identical tab thickness as in FIG. 12A, but with a thinner width 1316 of the damper 1318, as compared to FIG. 12A. The damper 1318 is dimensioned to fit the motor mount tab 1314 and motor mount edge 1312. The damper 1318 provides an increase in thrust spring rate as compared to FIG. 13A.

FIG. 13C depicts a cross-sectional view 1320 of a motor mount edge 1322 having a tab 1324 with an identical tab thickness as in FIG. 12A, but with a thicker width 1326 of the damper 1328, as compared to FIG. 13A. The damper 1318 is dimensioned to fit the motor mount tab 1314 and motor mount edge 1312. The damper 1318 provides a decrease in thrust spring rate as compared to FIG. 13A.

FIGS. 14A-14C depict cross-sectional views of a damper and tab with varying tab lengths, a constant tab thickness, and a constant damper thickness. FIG. 14A depicts a cross-sectional view 1400 of a tab 1402 having a width 1404 and a length 1406. A damper 1408 is dimensioned to fit the motor mount tab 1402 and motor mount edge 1410.

FIG. 14B depicts a cross-sectional view 1412 of a motor mount edge 1414 having a tab 1416 with an identical tab thickness as in FIG. 14A, but with a wider width 1418 of the tab 1416, as compared to FIG. 14A. The damper 1420 is dimensioned to fit the motor mount tab 1416 and motor mount edge 1414. The damper 1420 provides an increase in rotational spring rate and thrust spring rate as compared to FIG. 14A.

FIG. 14C depicts a cross-sectional view 1422 of a motor mount edge 1424 having a tab 1426 with an identical tab thickness as in FIG. 14A, but with a narrower width 1428 of the tab 1426, as compared to FIG. 14A. The damper 1430 is dimensioned to fit the motor mount tab 1426 and motor mount edge 1424. The damper 1430 provides a decrease in rotational spring rate and thrust spring rate as compared to FIG. 14A.

Figure 15B:
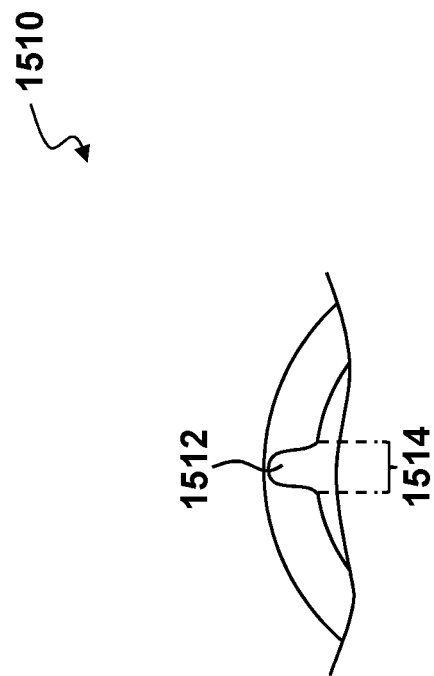
FIGS. 15A-15C depict top views of a motor fin with varying thicknesses.
Figure 15C:
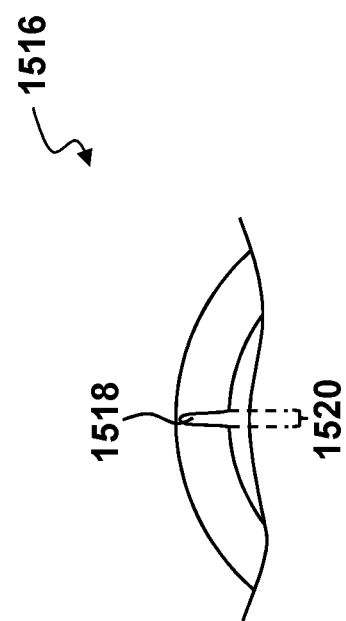
Figure 15A:
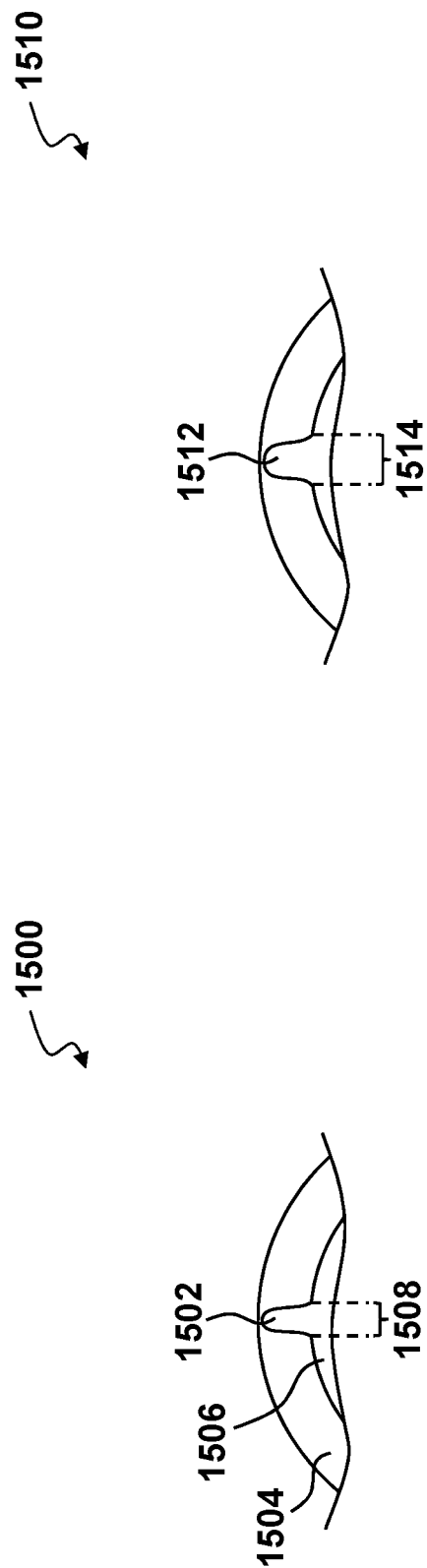

FIGS. 15A-15C depict top views of a motor fin with varying thicknesses. FIG. 15A depicts a top view 1500 of a fin 1502 protruding from a lower face 1504 of a motor to a front face 1506 of the motor. The fin 1502 has a width 1508.

FIG. 15B depicts a top view 1510 of a fin 1512 having a thicker width 1514, as compared to FIG. 15A. A damper dimensioned to fit the fin 1512 provides an increase in torsional spring rate as compared to a damper dimensioned to fit the fin in FIG. 15A.

FIG. 15C depicts a top view 1516 of a fin 1518 having a thinner width 1520, as compared to FIG. 15A. A damper dimensioned to fit the fin 1518 provides a decrease in torsional spring rate as compared to a damper dimensioned to fit the fin in FIG. 15A.

FIGS. 16A-16C depict side views of a damper with varying thicknesses. FIG. 16A depicts a side view 1600 of a damper 1602 having indentations (1604, 1606, 1608, 1610, 1612) extending over halfway through a width of the damper, i.e., past a centerline 1614 of the damper 1602. The damper 1602 has a thickness 1616.

FIG. 16B depicts a side view 1618 of a damper 1620 where the width 1622 of the damper 1620 is thicker than in FIG. 16A. The damper 1620 provides a decrease in thrust spring rate per tab as compared to FIG. 16A.

FIG. 16C depicts a side view 1624 of a damper 1626 where the width 1628 of the damper 1626 is thinner than in FIG. 16A. The damper 1626 provides an increase in thrust spring rate per tab as compared to FIG. 16A. Increasing or decreasing the spring rate directly correlates to the tile/yaw spring rate.

Figure 17:
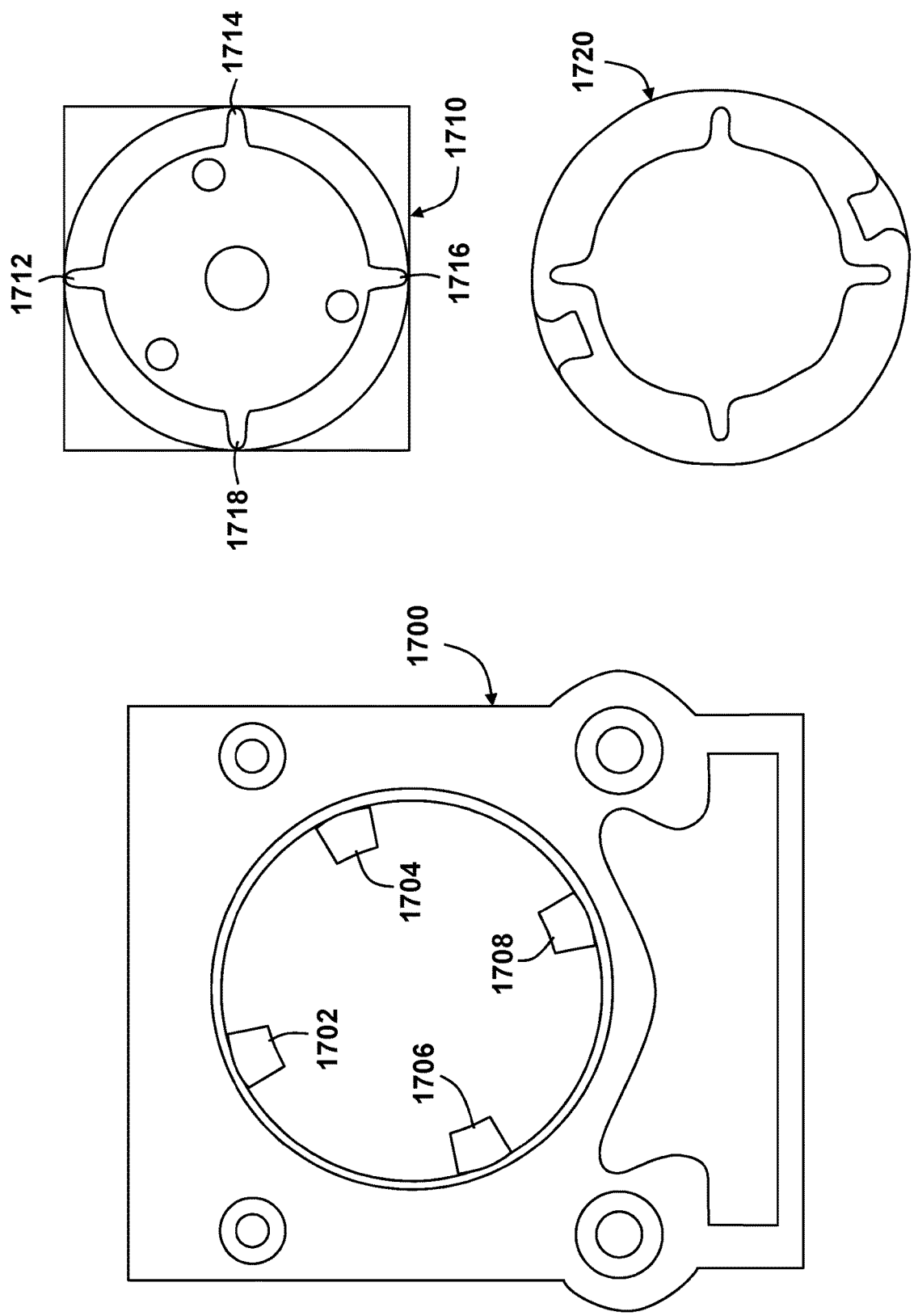
FIG. 17 depicts a top view of a motor mount having an alternate number of tabs, a motor having an alternate number of fins, and a damper dimensioned to fit the motor mount and motor.

FIG. 17 depicts a top view of a motor mount having an alternate number of tabs, a motor having an alternate number of fins, and a damper dimensioned to fit the motor mount and motor. A motor mount 1700 has four equally-spaced tabs (1702, 1704, 1706, 1708). A motor 1710 has four equally-spaced fins (1712, 1714, 1716, 1718). A damper 1720 is dimensioned to fit the tabs (1702, 1704, 1706, 1708) of the motor mount 1700 and the fins (1712, 1714, 1716, 1718) of the motor 1710. The damper 1720 provides a decreased torsional spring rate and decreased thrust spring rate as compared to the embodiment shown in FIG. 6. As the number of fins (1712, 1714, 1716, 1718) is reduced, the torsional spring rate decreases.

Figure 18:
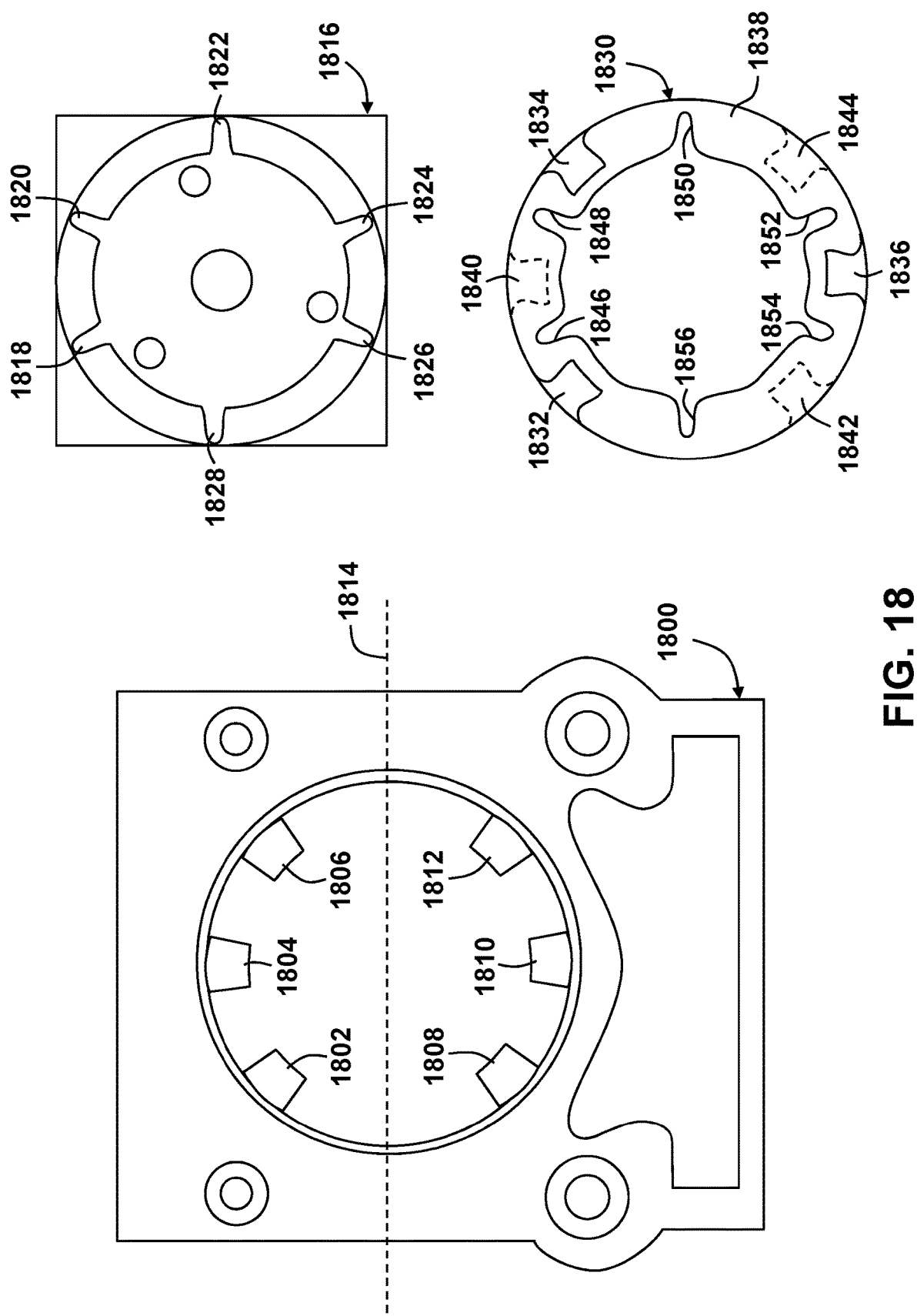
FIG. 18 depicts a top view of a motor mount having an alternate positioning of tabs, a motor having an alternate positioning of fins, and a damper dimensioned to fit the motor mount and motor.

FIG. 18 depicts a top view of a motor mount having an alternate positioning of tabs, a motor having an alternate positioning of fins, and a damper dimensioned to fit the motor mount and motor. A motor mount 1800 has six tabs (1802, 1804, 1806, 1808, 1810, 1812) arranged in an alternate, not equally spaced, spacing. The tabs (1802, 1804, 1806, 1808, 1810, 1812) are symmetrical about a horizontal axis 1814. A motor 1816 has six fins (1818, 1820, 1822, 1824, 1826, 1828) arranged in an alternate, not equally spaced, spacing. A damper 1830 has three indentations (1832, 1834, 1836) extending into a front face 1838 of the damper 1830. Each of these three indentations (1832, 1834, 1836) receives a corresponding tab (1802, 1806, 1810) from the motor mount 1800. Three additional indentations (1840, 1842, 1844) extend into a back face of the damper 1830, as depicted in dashed lines. Each of these three additional indentations (1840, 1842, 1844) receives a corresponding tab (1804, 1808, 1812) from the motor mount 1800. The damper 1830 has six indentations (1846, 1848, 1850, 1852, 1854, 1856) which each receive respective fins (1818, 1820, 1822, 1824, 1826, 1828) from the motor 1816. The arrangement shown in FIG. 18 has an increased pitch spring rate and a decreased yaw spring rate as compared to the embodiment shown in FIG. 6. An embodiment with varying pitch and yaw spring rates, as shown in FIG. 18 may be used where damping across one axis is desired and where damping across another axis is not desired and/or not as crucial.

Figure 19B:
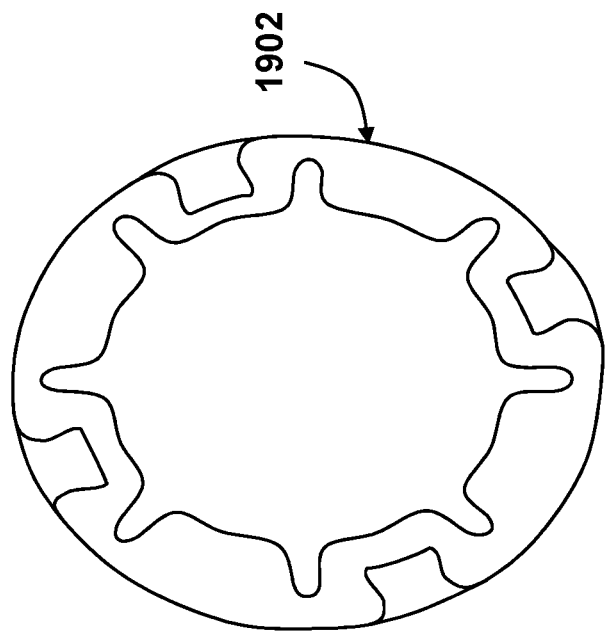
FIGS. 19A-19B depict top views of a damper with varying shapes.
Figure 19A:
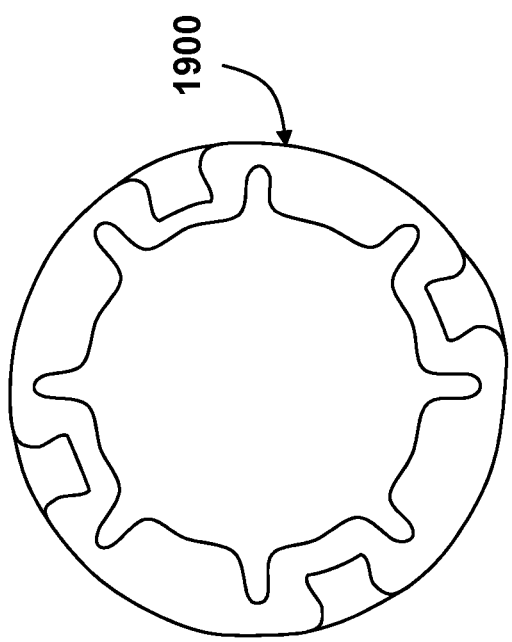

FIGS. 19A-19B depict top views of a damper with varying shapes. FIG. 19A depicts a damper 1900 having a round shape. FIG. 19B depicts a damper 1902 having an elongated oval shape. The damper 1902 has a greater pitch spring rate, a lower yaw spring rate, a similar thrust spring rate, and a similar torsional spring rate as compared to FIG. 19A.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A system comprising:
   a damper, the damper comprising:
      two or more indentations on alternating faces of the damper, wherein each indentation is open to an outer circumferential surface of the damper and extends partially through a width of the outer circumferential surface of the damper; and
      one or more slots, each slot open to an inner circumferential surface of the damper and extending at least partially through the width of the damper;
   a motor mount, the motor mount comprising two or more tabs, wherein the two or more tabs of the motor mount are seated in the two or more indentations of the damper; and
   wherein an air space remains in each of the two or more indentations after the two or more tabs are seated in the two or more indentations of the damper for further compression of the damper against each of the two or more tabs.

2. The system of claim 1, further comprising:
   a motor, the motor comprising one or more fins disposed along an outer edge of the motor,
   wherein the one or more fins of the motor are seated in the one or more slots of the damper.

3. The system of claim 2, wherein the motor comprises six or more fins disposed along the outer edge of the motor.

4. The system of claim 1, wherein the motor mount is connected to a fuselage of an unmanned aerial vehicle (UAV).

5. The system of claim 1, wherein the motor mount comprises six or more tabs.

6. The system of claim 1, wherein each of the two or more indentations has opposing indentation sidewalls with curved edges, and wherein the two or more tabs of the motor mount are seated in the two or more indentations of the damper.

7. The system of claim 6, wherein each of the curved edges of the opposing indentation sidewalls compress against each respective tab.

8. The system of claim 1, wherein the two or more tabs of the motor mount are seated in the two or more indentations of the damper to self-encapsulate the outer circumferential surface of the damper in the motor mount.

9. The system of claim 1, wherein the motor mount is connected to a fuselage of an aerial vehicle (AV).

10. The system of claim 1, wherein the two or more indentations comprise six or more indentations.

11. The system of claim 10, wherein the one or more slots comprise six or more slots.

12. The system of claim 1, wherein the two or more indentations each extend over halfway through the width of the outer circumferential surface of the damper.

13. The system of claim 1, wherein the two or more indentations each do not extend entirely through the width of the outer circumferential surface of the damper.

14. The system of claim 1, wherein the alternating faces of the damper are a front face of the damper and a rear face of the damper.

15. The system of claim 1, wherein the one or more slots are disposed between each of the two or more indentations.

16. The system of claim 1, wherein damping of at least one of yaw, thrust, pitch, roll, and radial motions is adjusted by at least one of: varying the tab thickness, varying the fin thickness, and varying the damper thickness.

17. The system of claim 1, wherein damping of at least one of yaw, thrust, pitch, roll, and radial motions is adjusted by at least one of: varying the number of tabs and varying the number of fins.

18. The system of claim 1, wherein damping of at least one of yaw, thrust, pitch, roll, and radial motions is adjusted by at least one of: asymmetrically positioning the fins and tabs and asymmetrically biasing the diameter of the damper.

19. The system of claim 1, wherein damping of at least one of yaw, thrust, pitch, roll, and radial motions is adjusted by at least one of: changing a diameter of the damper and creating a non-round shape of the damper.

* * * * *